US008950860B2

(12) United States Patent
Tse et al.

(10) Patent No.: US 8,950,860 B2
(45) Date of Patent: Feb. 10, 2015

(54) METHOD AND SYSTEM FOR RETARDING THE PROGRESSION OF MYOPIA

(75) Inventors: Yan Yin Tse, Hong Kong (HK); Chi Ho To, Hong Kong (HK); Siu Yin Lam, Hong Kong (HK)

(73) Assignee: The Hong Kong Polytechnic University, Hong Kong (HK)

( * ) Notice: Subject to any disclaimer, the term of this patent is extended or adjusted under 35 U.S.C. 154(b) by 1070 days.

(21) Appl. No.: 12/878,777

(22) Filed: Sep. 9, 2010

(65) Prior Publication Data

US 2012/0062836 A1  Mar. 15, 2012

(51) Int. Cl.
G02C 7/02 (2006.01)
G02C 7/04 (2006.01)

(52) U.S. Cl.
CPC .............. *G02C 7/044* (2013.01); *G02C 7/042* (2013.01); *G02C 2202/24* (2013.01)
USPC .................................................. 351/159.41

(58) Field of Classification Search
USPC ............ 351/159.01, 159.05, 159.06, 159.12, 351/159.41–159.43
See application file for complete search history.

(56) References Cited

U.S. PATENT DOCUMENTS

| 5,517,260 | A  | * | 5/1996  | Glady et al. ............. 351/159.42 |
| 6,045,578 | A  |   | 4/2000  | Collins et al. |
| 6,752,499 | B2 |   | 6/2004  | Aller |
| 7,025,460 | B2 |   | 4/2006  | Smitth et al. |
| 7,506,983 | B2 |   | 3/2009  | To et al. |
| 7,832,859 | B2 |   | 11/2010 | Phillips |
| 8,240,847 | B2 |   | 8/2012  | Holden et al. |
| 2003/0058407 | A1 | | 3/2003 | Aller |
| 2006/0082729 | A1 | | 4/2006 | To et al. |
| 2008/0218687 | A1 | * | 9/2008 | Phillips ......................... 351/161 |
| 2012/0194780 | A1 | | 8/2012 | Back |

FOREIGN PATENT DOCUMENTS

| CA | 2263635 C    | 11/2003 |
| CN | 1909860 A    | 2/2007  |
| CN | 101467092 A  | 6/2009  |
| CN | 101688983 A  | 3/2010  |
| JP | H 06-051248 A2 | 2/1994 |
| JP | 2008-514318  | 5/2008  |
| JP | 2008-250316  | 10/2008 |
| JP | 2009-540373  | 11/2009 |
| JP | 2013-501963  | 1/2013  |

(Continued)

OTHER PUBLICATIONS

U.S. Appl. No. 60/584,894.
U.S. Appl. No. 60/905,821.

(Continued)

*Primary Examiner* — James Greece
(74) *Attorney, Agent, or Firm* — Muncy, Geissler, Olds & Lowe, P.C.

(57) ABSTRACT

A method for retarding the progression of myopia in a human eye, the method comprising: providing (41) a concentric annular multi-zone refractive lens including: at least one correcting zone of optical power for correcting (42) refractive error, and at least one defocusing zone for projecting (43) at least one non-homogenous defocused image in front of at least a part of retina to inhibit myopic eye growth, the at least one defocusing zone having at least one less negative power; wherein the correcting and defocusing zones are alternated (45) in the lens and the zones are connected (46) to each other through integrated progressive transition curves.

26 Claims, 4 Drawing Sheets

(56) References Cited

FOREIGN PATENT DOCUMENTS

| | | |
|---|---|---|
| WO | WO 2006/034652 A1 | 4/2006 |
| WO | WO 2007/146673 A2 | 12/2007 |

OTHER PUBLICATIONS

Tse, D. Y., H. E. Bowrey, et al. (2010). Modulation of Mammalian Ocular Growth and Myopia Progression With Competing Defocus. The Association for Research in Vision and Ophthalmology, Fort Lauderdale, Florida.

Tse, D. Y., J. W. Chan, et al. (2008). Effects of Defocus Solid Angle on Emmetropization in Chicks Under Competing Defocus. The Hong Kong Polytechnic University, Hong Kong.

Tse, D. Y., C. S. Lam, et al. (2007). "Simultaneous Defocus Integration during Refractive Development." Invest Ophthalmol Vis Sci 48(12): 5352-9.

Wallman, J. and J. Winawer (2004). "Homeostasis of eye growth and the question of myopia." Neuron 43(4): 447-68.

Japanese Office Action for Japanese Application No. P2013-527440 dated Jun. 3, 2014 with English translation.

* cited by examiner

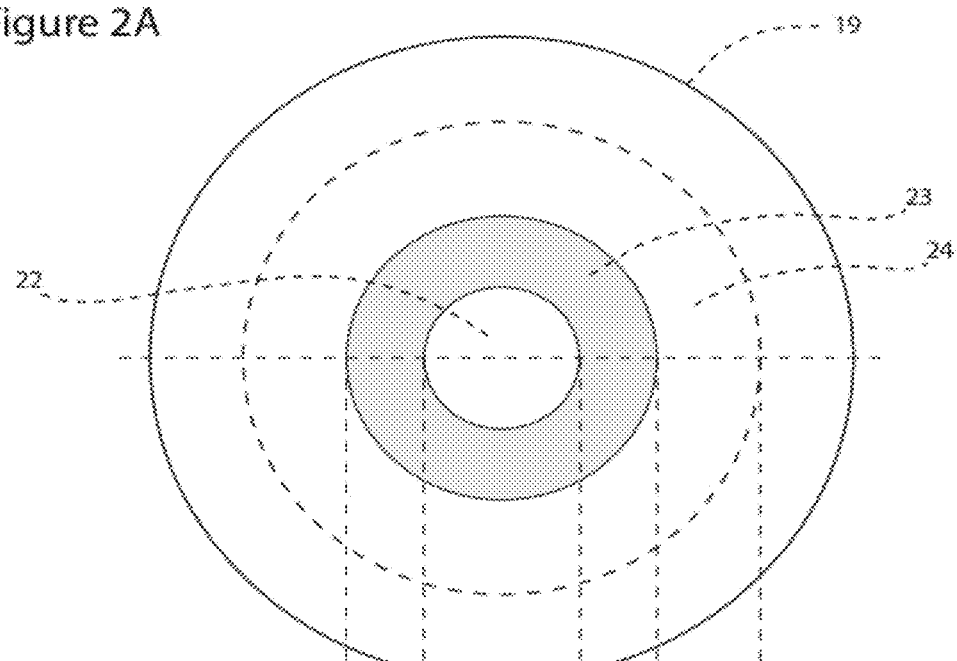
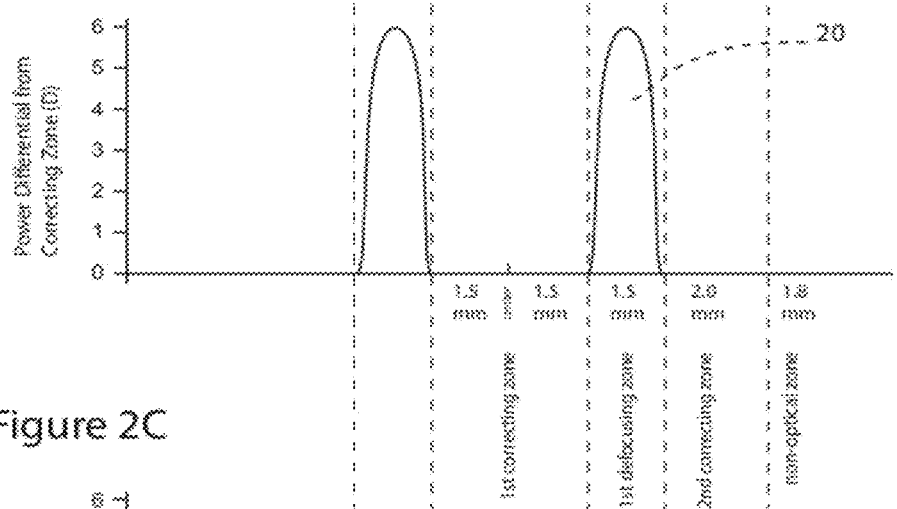
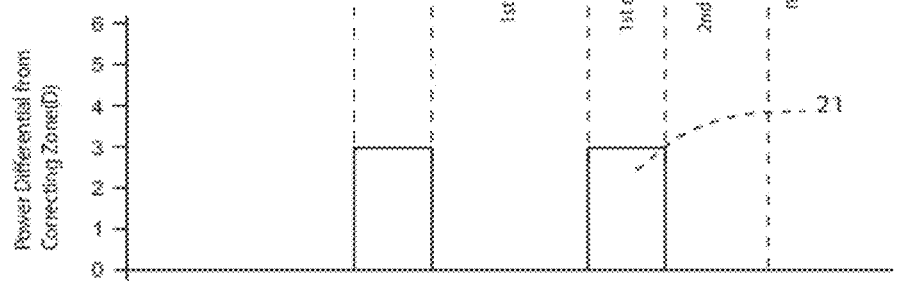

METHOD AND SYSTEM FOR RETARDING THE PROGRESSION OF MYOPIA

TECHNICAL FIELD

The present invention relates to a method and system for retarding the progression of myopia.

BACKGROUND OF THE INVENTION

Shortsightedness or myopia is a common refractive disorder of human eyes. Objects beyond a distance from a myopic person are focused in front of the retina and is perceived as blurry images. Common myopia develops when the eye grows excessively longer than the combined focal length of the optical elements of the eye. Myopia usually progresses in human eyes over time and is typically managed by regularly renewed prescriptions of corrective spectacles and contact lens. Those lenses provide clear vision but do not retard progression of myopia. Undesirable sight-threatening eye diseases are also associated with high myopia. Therefore, there is a need for new technology to reduce the economical and social burden produced by common myopia by providing clear vision and a retardation function at the same time. Recent scientific publications have stated that the dimensional growth of developing eyes is modulated by optical defocus, which is resulted when images are projected away from the retina. Refractive development of the eye is influenced by the equilibrium between defocus of opposite directions. In particular, it has been documented that artificially induced "myopic defocus" (image projected in front of the retina) may retard myopia from progressing further.

U.S. Pat. No. 7,025,460 [Smith] teaches a method to introduce peripheral (off-axis) myopic defocus relative to central (on-axis) focused image to control the progression of myopia. It teaches against projections of defocus on central retina to provide clear vision correction. The method may not be able to achieve optimal effectiveness for retarding myopia progression. A similar problem is evident in the disclosure of PCT application PCT/US2007/070419 [Holden]. Holden teaches that the peripheral optical zone producing defocus be substantially outside the normal pupil diameter of the patient. A similar problem is also evident in the disclosure of U.S. patent application 60/584,894 [Phillips]. Phillips suggests a non-concentric design to degrade optical quality.

WO 2006/034652 [To] teaches the use of concentric multi-zone bifocal lenses in which myopic defocus is induced both axially and peripherally for visual objects of all viewing distances. Those teachings have been shown to be effective in both animal study and human clinical trial for retarding myopia progression. However, minor problems have been identified in the clinical trial and is waiting to be improved. The use of bifocal lens taught projects a secondary single homogeneous defocused image, which is sometimes perceived as a bright "ghost" image causing discomfort to the patient. In addition, the homogeneous secondary defocused image might mislead a minor portion of the patients to adjust their accommodation habit and choose to focus with the secondary defocused image instead of the designated primary image and thus jeopardizing the retarding function. Similar problems are evident in U.S. patent application 60/905,821 [Phillips], in which a concentric multi-zone bifocal lens using the same principle was described as a form of contact lens.

U.S. Pat. No. 6,045,578 [Collins] discloses a method manipulating spherical aberration for myopia control. In optical and mathematical terms, longitudinal aberration describes the extent where marginal rays are bent more than or less than the paraxial rays. It is different from optical defocus which describes the distance an image is away from the reference image plane (retina in eye). Unlike the case of defocus, it has not gained support from scientific literature and there is no identified report that manipulating spherical aberration has any effect on retarding myopia progression.

U.S. Pat. No. 6,752,499 [Aller] teaches prescribing commercially available bifocal contact lenses to young myopic patients who also exhibit near point esophoria and accommodative lag to control myopia. Its effectiveness is questionable because a higher dose of undesirable hyperopic defocus is induced by the primary refractive power (distant zone) when it teaches to reduce the esophoria and accommodative lag during near vision as it requires the wearer to switch their focus to use the second refractive power (near zone). In addition, it is not supported from more recent literature that esophoria is related to myopia progression.

SUMMARY OF THE INVENTION

In a first preferred aspect, there is provided a method for retarding the progression of myopia in a human eye, the method comprising:
  providing a concentric annular multi-zone refractive lens including:
    at least one correcting zone of optical power for correcting refractive error, and
    at least one defocusing zone for projecting at least one non-homogenous defocused image in front of at least a part of retina to inhibit myopic eye growth, the at least one defocusing zone having at least one less negative power;
  wherein the correcting and defocusing zones are alternated in the lens and the zones are connected to each other through integrated progressive transition curves.

The lens may be in the form of a contact lens and its optical surface includes 2 to 40 alternating correcting and defocusing zones.

The lens may have a central zone that is a circular first correcting zone having a diameter smaller than the pupil of the eye under photopic lighting.

The first correcting zone may be immediately surrounded by a first defocusing zone having an annular shape.

The first defocusing zone may be immediately surrounded by a second correcting zone having an annular shape.

The second correcting zone may be surrounded by additional defocusing zones and correcting zones in an alternating manner.

The lens may have a central zone that is a circular first defocusing zone having a diameter smaller than the pupil of the eye under photopic lighting.

The first defocusing zone may be immediately surrounded by a first correcting zone having an annular shape.

The first correcting zone may be immediately surrounded by a second defocusing zone having an annular shape.

The second defocusing zone may be surrounded by additional defocusing zones and correcting zones in an alternating manner.

The maximal difference between the power of the at least one correcting zone and the peak power of the at least one defocusing zone may be between about 0.5 to 10.0 diopters.

The method may further comprise:
  using the at least one correcting zone to focus on visual objects at all distances for viewing purpose, and
  using ocular accommodation for near viewing tasks.

The diameter of the central zone may be about 2.0 mm to 4.5 mm.

At least part of the at least one defocusing zone and at least a part of the correcting zone may overly the pupil at the same time.

The method may further comprise using a range of powers for the at least one defocusing zone.

The power profile of the at least one defocusing zone may be progressive causing transitions between adjacent curves to become progressive.

The progressive power profile may be generated by adjusting the radius of curvature of the anterior refractive surface of the lens or by adjusting the posterior curvature or the refractive index of the lens.

The method may further comprise using an integrated progressive transition curve between adjacent zones of the lens.

The method may further comprise maintaining the same single homogeneous power over the at least one correcting zone.

The lens may have seven correcting zones and six defocusing zones to maintain a relatively stable area ratio between the correcting zones and defocusing zones for a range of pupil sizes and lighting conditions.

The lens may have two correcting zones and one defocusing zone.

In a second aspect, there is provided a system for retarding the progression of myopia in a human eye, the system comprising:
a concentric annular multi-zone refractive lens including:
at least one correcting zone of optical power for correcting refractive error, and
at least one defocusing zone for projecting at least one non-homogenous defocused image in front of at least a part of retina to inhibit myopic eye growth, the at least one defocusing zone having at least one less negative power;
wherein the correcting and defocusing zones are alternated in the lens and the zones are connected to each other through integrated progressive transition curves.

In a third aspect, there is provided a method for retarding the progression of myopia in a human eye, the method comprising:
generating a focused image on a retina of the human eye to correct a refractive error of the eye and provide clear vision; and
at the same time, generating at least one non-homogenous defocused image in front of the central retina to create myopic defocus to retard the progression of myopia.

In a fourth aspect, there is provided a concentric multi-zone multifocal lens having a characteristic partial sinusoidal power profile, the lens comprising:
at least one correcting zone of optical power for correcting refractive error, and
at least one defocusing zone for projecting at least one non-homogenous defocused image in front of at least a part of retina to inhibit myopic eye growth, the at least one defocusing zone having at least one less negative power;
wherein the correcting and defocusing zones are alternated in the lens and the zones are connected to each other through integrated progressive transition curves.

The method for treating progression of myopia in a human eye includes producing at least one focused image on a retina of the human eye and at least one non-homogenous defocused images (or referred to as heterogeneous defocused image) in front of the retina to generate myopic defocus.

The method for treating progression of myopia in a human eye includes providing a concentric annular multi-zone lens having correcting zones and defocusing zones.

The correcting zones provide a refractive power to correct the refractive error of the eye. The defocusing zones include a range of less negative refractive powers for generating defocus.

Preferably, the concentric annular multi-zone lens are provided in the form of contact lenses. In particular, contact lenses are highly suitable for myopic children and young adults whose pupils are relatively large.

The method for treating progression of myopia in a human eye includes generating defocus on the entire retina including both axial retina and peripheral retina in order to achieve maximal effectiveness.

The multi-zone lens of the present invention has both correcting zones and defocusing zones which overlie the pupil so that axial rays originated from objects in the central vision field are intercepted by both zones to project a sharp image on the retina and a defocused image or defocused images in front of the retina at the same time.

Experiments have shown that myopic defocus induced by using a concentric annular multi-zone lens effectively retards myopia progression in chickens, guinea pigs and human children. It is also desirable to maintain providing clear vision while eliminating the undesired visual disturbance caused by the secondary defocused image, which is made to be a single homogeneous image of high optical quality and brightness. In the present invention, to eliminate the undesired visual disturbance, the following techniques are possible:
(i) using a range of powers for the defocusing zones instead of a single power,
(ii) using a progressive (for example, sinusoidal) power profile for the defocusing zones,
(iii) using an integrated progressive transition curve between adjacent zones,
(iv) maintaining the same single homogeneous power over the correcting zones, and
(v) using a larger difference between the single power of the correcting zones and the peak power of the defocusing zones.

The progressive transition curve is integrated in the progressive power profile of the defocusing zones.

The progressive (for example, sinusoidal) power profile of the defocusing zones is preferably achieved by manipulating the radius of curvature of the anterior refractive surface of the lens. It is also possible to achieve a progressive power profile for each defocusing zone by manipulating the posterior curvature or the refractive index of the lens.

To ensure that the defocused images are formed on the central retina, at least part of the defocusing zone and at least a part of the correcting zone overlies the pupil at the same time. To provide this effect, the central first correcting/defocusing zone is smaller than the pupil as measured under photopic lighting condition. It has been found that the pupil sizes of the target population range between 4.0 mm to 5.0 mm under photopic conditions, and between 6.0 mm to 7.8 mm under dim lighting conditions. Although it is desirable for lenses to be custom-made for individuals using measured parameters, it is possible to estimate appropriate zone widths using population averages based on age and ethnicity to facilitate mass production of lenses.

BRIEF DESCRIPTION OF THE DRAWINGS

An example of the invention will now be described with reference to the accompanying drawings, in which:

FIG. 2A is a frontal view of a 3-zone concentric multi-zone contact lens in accordance with an embodiment of the present invention;

FIG. 2B shows a desirable power profile across the lens in accordance with an embodiment of the present invention;

FIG. 2C shows a less desirable power profile across a concentric multi-zone lens of the prior art;

DETAILED DESCRIPTION OF THE DRAWINGS

Two examples for retarding progression of myopia in human eyes are described. The apparatuses used to practice this method alter the defocus equilibrium of the eye to influence dimensional eye growth in a direction towards emmetropia. In particular, myopic defocus is induced in the eye to retard the progression of myopia. The myopic defocus can be introduced by various ways and apparatuses, for example, by spectacle lens, spectacle lens add-on, contact lens, corneal or intraocular implant. It is important that myopic defocus is introduced when normal vision is maintained throughout the treatment. That means that a focused homogenous image must be maintained at the central retina during the treatment. A concentric bifocal lens splits incoming light rays and focuses them into two images. Therefore, it is an effective means for simultaneously providing clear vision and myopic defocus. An important next step is to reduce undesirable visual disturbance caused by the homogenous defocused image overlapping on the focused retina image while achieving optimal retarding effect.

A treatment method is provided to introduce multiple defocused images in front of the retina and a single homogeneous focused image on the retina. This is preferably achieved using a concentric multi-zone multifocal lens having a characteristic partial sinusoidal power profile.

Figure 1A:
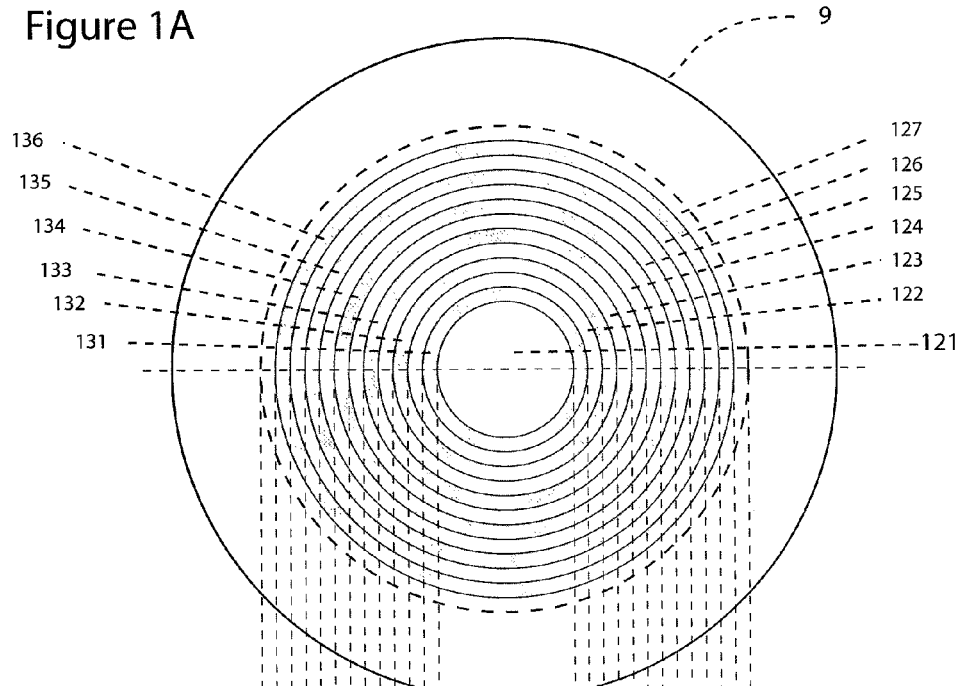
FIG. 1A is a frontal view of a 13-zone concentric multi-zone multi-defocusing contact lens in accordance with an embodiment of the present invention.

Referring to FIG. 1A, a 13-zone contact lens 9 is provided as a concentric multi-zone multifocal lens having a characteristic partial sinusoidal power profile. There are seven correcting zones and six defocusing zones alternating in a concentric manner. The lens 9 has a: central first correcting zone 121, second correcting zone 122, third correcting zone 123, fourth correcting zone 124, fifth correcting zone 125, sixth correcting zone 126, seventh correcting zone 127, first defocusing zone 131, second defocusing zone 132, third defocusing zone 133, fourth defocusing zone 134, fifth defocusing zone 135 and sixth defocusing zone 136. This number of alternating zones allows a reasonably stable area ratio between the two zones to be maintained under a range of pupil sizes and lighting conditions. Therefore stable clear vision and retarding effectiveness can be maintained in different lighting conditions. A central first correcting zone 121 has a diameter of 2.8 mm, which is smaller than the typical pupil size of children and young adults (4.0-5.0 mm). Therefore, a few consecutive annular defocusing and correcting zones always overlies on the pupil and introduce a defocused image on the retina including the central on-axis region. The width of each annular zone of alternating functions is 0.3 mm. All seven correcting zones share the same power to neutralize the pre-existing myopia (for example, distance prescription) of a wearer. For example, if the wearer has 3D of myopia, the power of the correcting zone may be −3D. The homogenous power profile in the correcting zones ensure that the image formed is homogenous and of high optical quality for good vision. On the other hand, each of the six defocusing zones comprises a range of less negative powers. The progressive (for example, sinusoidal or multiple stepwise) power profile 10 of the defocusing zones does not introduce a homogenous secondary defocused image but non-homogenous multiple defocused images that are slightly separated from each others and of lower intensity. This is in contrast to a square power profile 11 of the lens of the prior art, The 5D power differences between correcting zones and defocusing zones ensure that the defocus generated is potent enough to achieve optimal retarding effect. For example the power of each of the defocusing zone ranges between −3 to +2D to introduce myopic defocus, if the wearer has 3D of myopia. An extra benefit from the sinusoidal power profile of the defocusing zones is that the transitions between adjacent curves become progressive and do not create undesirable diffraction as created by the sudden power change 13 in the square power profile of prior art designs. A progressive transition curve occurs where the power change across adjacent zone is continuous. There are many possible shapes which can be regarded as progressive transition including but not limited to: sigmoidal, polynomial, sinusoidal, conical, parabolic. In the described embodiment, the method is described with reference to an example using a partial sinusoidal shape for the overall power profile of the lens.

The edge of the lens 9 is made of a non-optical zone for lens stabilization purpose. The total diameter of the lens 9 in the example is 13.6 mm. It is preferred that the alternating sinusoidal power profile be achieved by manipulating the radius of curvature of the anterior surface of the lens 9, and leaving the posterior surface for toric manipulations to correct astigmatism.

Figure 1B:
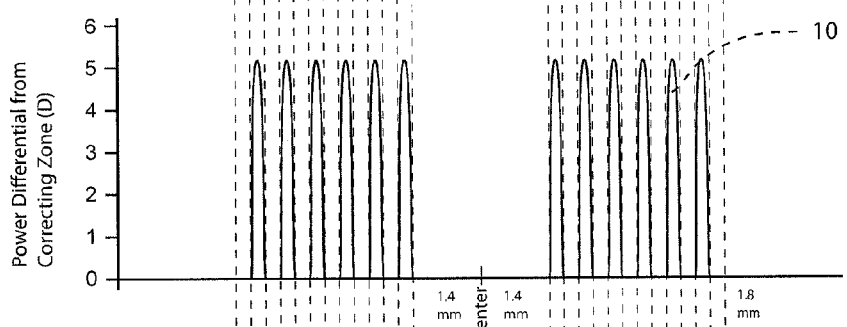
FIG. 1B shows a desirable power profile across the lens in accordance with an embodiment of the present invention.
Figure 1C:
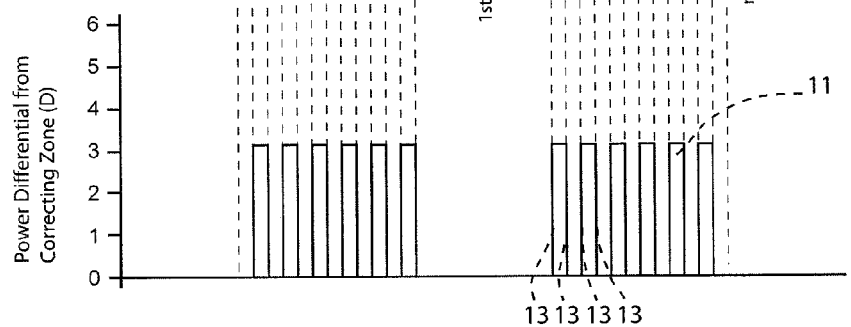
FIG. 1C shows a less desirable power profile across a concentric multi-zone lens of the prior art.

In FIG. 1B, the power profile of each defocusing zone is progressive and is like a sinusoidal pattern. In contrast, in FIG. 1C, the prior art shows that the power profile of each defocusing zone is homogenous, and that this square power profile of the lens causes a sudden power change 13.

Referring to FIG. 2A, a 3-zone contact lens 19 is provided as a concentric multi-zone multifocal lens having a characteristic partial sinusoidal power profile. There are two correcting zones and one defocusing zone alternating in a concentric manner. This number of alternating zones reduces manufacturing complexity yet still provides capability to introduce non-homogenous multiple defocused images covering the entire retina. The central correcting zone 22 has a diameter of 3 mm, which is smaller than the typical pupil size of children and young adults (4.0 mm to 5.0 mm). Therefore, the immediate surrounding annular first defocusing zone 23 always overlies with the pupil, introducing a defocused image on the retina (including the central on-axis region of the retina). The defocusing zone 23 has an annular width of 1.5 mm and is surrounding by a second correcting zone 24 having an annular width of 2.0 mm. Again, both of the two correcting zones 22, 24 share the same homogeneous power to neutralize the pre-existing myopia (for example, distance prescription) of the wearer. For example if the wearer has 4D of myopia, the power of the correcting zones 22, 24 may be −4D. The homogenous power profile in the correcting zones 22, 24 ensure that the image formed is homogenous and of high optical quality for good vision. On the other hand, the defocusing zone 23 comprises a range of less negative powers.

Figure 3A:
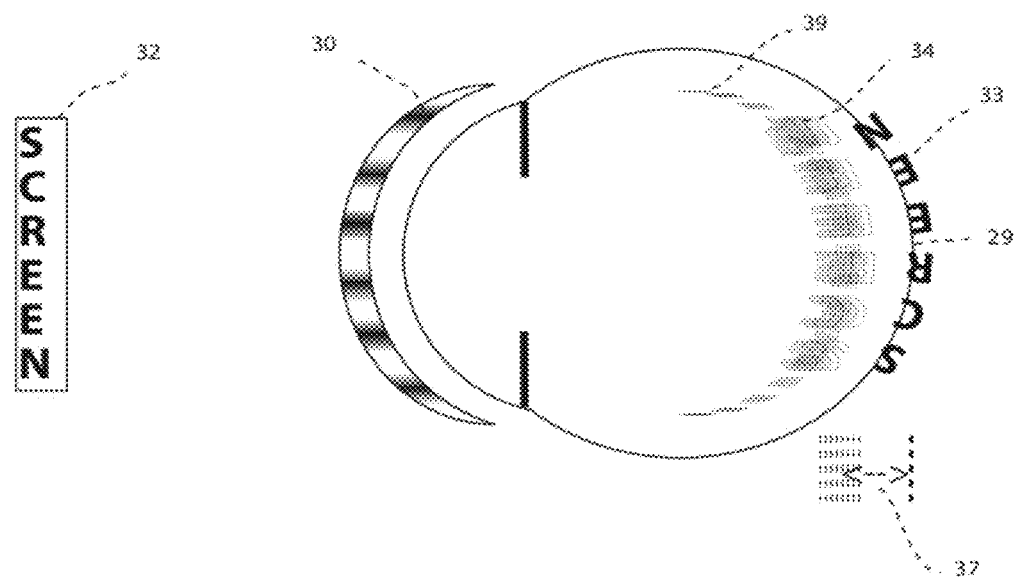
FIG. 3A is a diagram of a myopic eye fitted with a concentric multi-zone multi-defocusing lens in accordance with an embodiment of the present invention.

Referring to FIG. 2B, the sinusoidal power profiles 20 of the defocusing zone introduces multiple defocused images that are slightly separated from each others and of lower intensity as shown in FIG. 3A. The 6D power differences between correcting zones and defocusing zones ensure that defocus generated is potent enough to achieve optimal retarding effect. For example, the power of each of the defocusing zones ranges between −4 to +2D to introduce myopic defocus, if the wearer has 4D of myopia. The edge of the lens is made of a non-optic zone for lens stabilization purpose. The total lens diameter in this example is 13.6 mm.

Referring to FIG. 2B, the square power profile 21 of the prior art introduces a homogenous secondary defocused image. Furthermore, the prior art does not integrate any progressive transition curve as part of the power profile. Thus the power change across adjacent zones is non-continuous, abrupt, sudden, and stepwise.

In FIG. 2B, the power profile of the defocusing zone is progressive and is like a sinusoidal pattern. In contrast, in FIG. 2C, the prior art shows the power profile of each defocusing zone is homogenous.

Figure 3B:
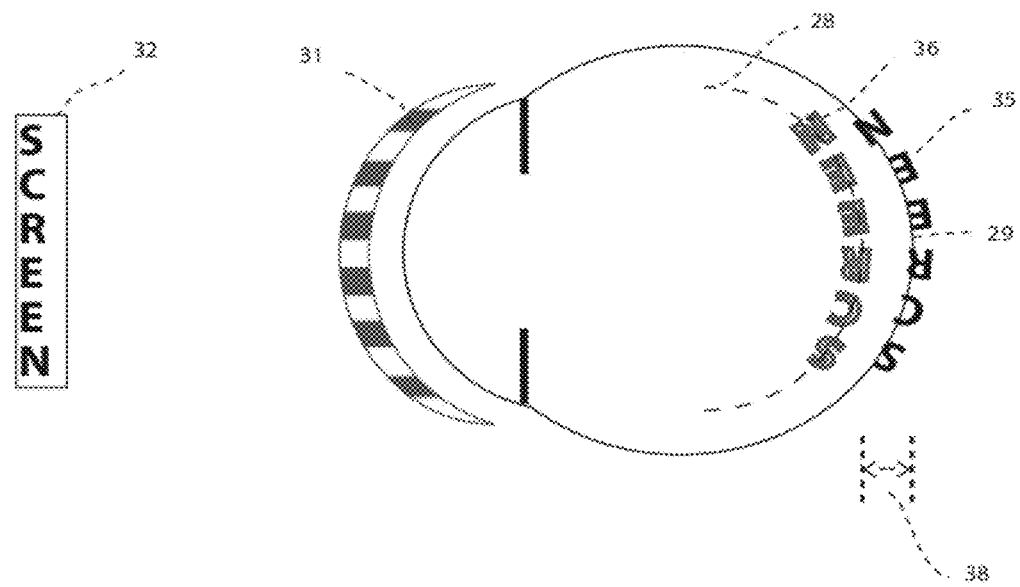
FIG. 3B is a diagram of a myopic eye fitted with a concentric multi-zone bifocal lens of the prior art.

In FIGS. 3A and 3B, a homogeneous focused image 33, 35 projected by a common object 32 is formed on the retina 29 to provide good vision.

Turning to FIG. 3A, a myopic eye fitted with a concentric multi-zone multi-defocusing lens 30 has a partial sinusoidal power profile. The multiple non homogeneous defocused images 34 produced by the present multi-defocusing lens 30 are non-homogeneous and are dim compared to the focused image 33 on the retina 29. Therefore, it does not serve as a significant source of visual disturbance while a therapeutic range of myopic defocus 37 may be maintained across the retina 29.

A common object 32 is projected as a homogenous focused image 33 on the retina 29, and as multiple non homogeneous defocused images 34 in front of the retina 29. A range of defocus 37 is induced over the retina 29 both axially and peripherally as the focal planes 39 extend across the entire retina 29.

Referring to FIG. 3B, a myopic eye fitted with a prior art concentric multi-zone bifocal lens 31 has a square power profile. The secondary defocused image 36 produced by the bifocal lens 31 is quite homogeneous compared to the homogenous focused image 35 on retina 29. Although a therapeutic dose of myopic defocus 38 is maintained across the retina 29, the homogeneous defocused image 36 serves as a source of visual disturbance.

A common object 32 is projected as a homogenous focused image 35 on the retina 29, and as another homogenous defocused image 36 in front of the retina 29. A homogeneous magnitude of defocus 38 is induced in front of the retina 29 both axially and peripherally as the focal plane 28 extends across the entire retina 29.

Figure 4:
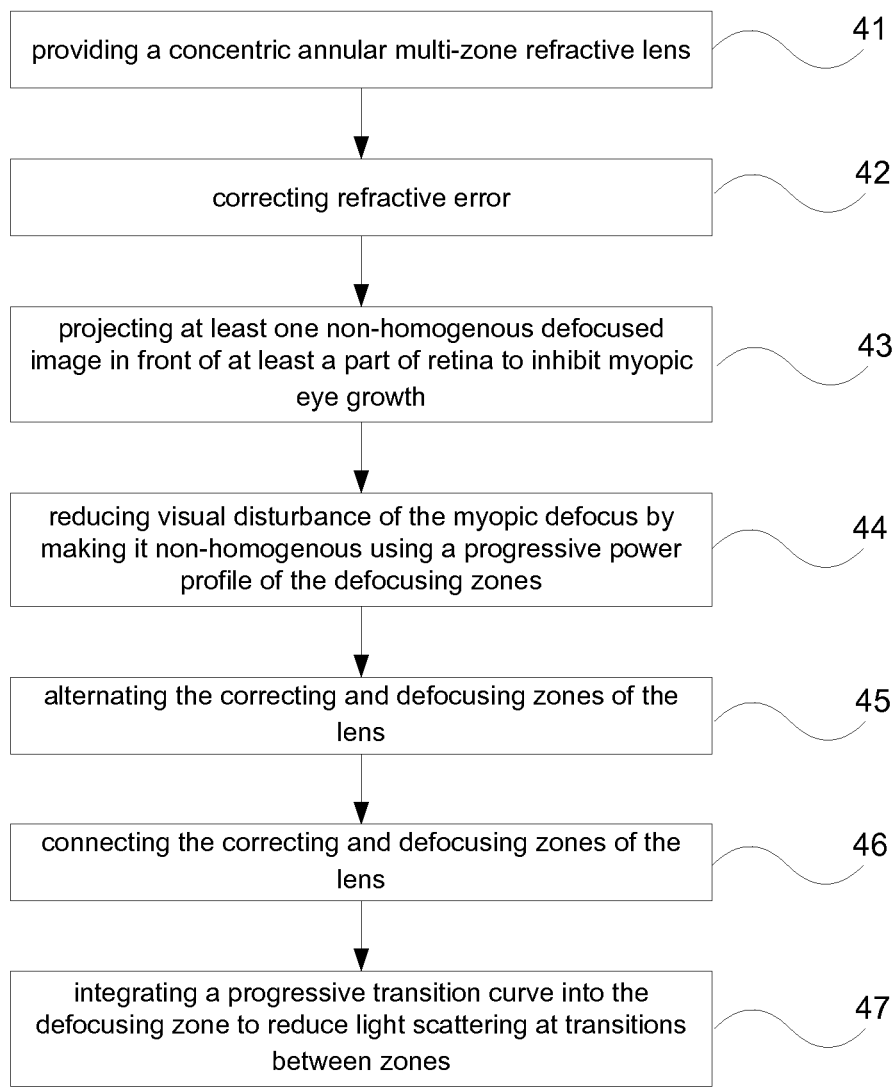
FIG. 4 is a process flow diagram of a method for retarding the progression of myopia in a human eye in accordance with a preferred embodiment of the present invention.

Referring to FIG. 4, the method described retards the progression of myopia in a human eye. A concentric annular multi-zone refractive lens is provided (41). The lens has at least one correcting zone of optical power for correcting (42) refractive error. When the refractive error is corrected by the correcting zone, clear vision is provided for objects at all distances and natural ocular accommodation is used for near tasks. The lens also has at least one defocusing zone for projecting (43) at least one non-homogenous defocused image in front of at least a part of retina to inhibit myopic eye growth. A non-homogenous myopic defocus is introduced on the retina using the defocusing zones at all times regardless of viewing distance. The at least one defocusing zone has at least one less negative power. The visual disturbance of the myopic defocus is reduced (44) by making it non-homogenous using a progressive power profile of the defocusing zones. By making the defocused image non-homogenous, misuse of the defocusing zones for viewing is avoided. Also, the non-homogenous myopic defocus inhibits eye growth. The correcting and defocusing zones are alternated (45) in the lens. The correcting and defocusing zones are connected (46) to each other through integrated progressive transition curves. This improves optical performance by reducing (47) light scattering at transitions between zones.

Although particular applications in curing and retarding the progression of refractive disorder of the eye have been described, it is envisaged that the present invention may be used in other applications such as preventing pathological myopic degeneration of the eye.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A method for retarding the progression of myopia in a human eye, the method comprising:
    providing a concentric annular multi-zone refractive lens including:
        at least one correcting zone of optical power for correcting refractive error, and
        at least one defocusing zone having a progressive power profile for projecting multiple defocus images or at least one non-homogenous defocused image in front of at least a part of retina to inhibit myopic eye growth, the at least one defocusing zone having at least one less negative power;
    wherein the at least one correcting zone and the at least one defocusing zone are alternated in the lens.

2. The method according to claim 1, wherein the lens is in the form of a contact lens and its optical surface includes 2 to 40 alternating correcting and defocusing zones.

3. The method according to claim 2, wherein the lens has a central zone that is a circular first correcting zone having a diameter smaller than the pupil of the eye under photopic lighting.

4. The method according to claim 3, wherein the first correcting zone is immediately surrounded by a first defocusing zone having an annular shape.

5. The method according to claim 4, wherein the first defocusing zone is immediately surrounded by a second correcting zone having an annular shape.

6. The method according to claim 5, wherein the second correcting zone is surrounded by additional defocusing zones and correcting zones in an alternating manner.

7. The method according to claim 2, wherein the lens has a central zone that is a circular first defocusing zone having a diameter smaller than the pupil of the eye under photopic lighting.

8. The method according to claim 7, wherein the first defocusing zone is immediately surrounded by a first correcting zone having an annular shape.

9. The method according to claim 8, wherein the first correcting zone is immediately surrounded by a second defocusing zone having an annular shape.

10. The method according to claim 9, wherein the second defocusing zone is surrounded by additional defocusing zones and correcting zones in an alternating manner.

11. The method according to claim 1, wherein the maximal difference between the power of the at least one correcting zone and the peak power of the at least one defocusing zone is between about 0.5 to 10.0 diopters.

12. The method according to claim 1, further comprising:
using the at least one correcting zone to focus on visual objects at all distances for viewing purpose, and
using ocular accommodation for near viewing tasks.

13. The method according to claim 3 or 7, wherein the diameter of the central zone is about 2.0 mm to 4.5 mm.

14. The method according to 1, wherein at least part of the at least one defocusing zone and at least a part of the correcting zone overlies the pupil at the same time.

15. The method according to 1, further comprising using a range of powers for the at least one defocusing zone.

16. The method according to 1, wherein the power profile of the at least one defocusing zone is progressive causing transitions between adjacent curves to become progressive.

17. The method according to 16, wherein the progressive power profile is generated by adjusting the radius of curvature of the anterior refractive surface of the lens or by adjusting the posterior curvature or the refractive index of the lens.

18. The method according to 1, further comprising using an integrated progressive transition curve between adjacent zones of the lens.

19. The method according to 1, further comprising maintaining the same single homogeneous power over the at least one correcting zone.

20. The method according to 1, wherein the lens has seven correcting zones and six defocusing zones to maintain a relatively stable area ratio between the correcting zones and defocusing zones for a range of pupil sizes and lighting conditions.

21. The method according to 1, wherein the lens has two correcting zones and one defocusing zone.

22. A system for retarding the progression of myopia in a human eye, the system comprising:
a concentric annular multi-zone refractive lens including:
at least one correcting zone of optical power for correcting refractive error, and
at least one defocusing zone having a progressive power profile for projecting multiple defocus images or at least one non-homogenous defocused image in front of at least a part of retina to inhibit myopic eye growth, the at least one defocusing zone having at least one less negative power;
wherein the at least one correcting zone and the at least one defocusing zone are alternated in the lens.

23. A method for retarding the progression of myopia in a human eye, the method comprising:
generating a focused image on a retina of the human eye to correct a refractive error of the eye and provide clear vision; and
at the same time, generating at least one non-homogenous defocused image via a progressive power profile in front of the central retina to create myopic defocus to retard the progression of myopia.

24. A concentric multi-zone multifocal lens having a characteristic partial sinusoidal power profile, the lens comprising:
at least one correcting zone of optical power for correcting refractive error, and
at least one defocusing zone having a progressive power profile for projecting multiple defocus images or at least one non-homogenous defocused image in front of at least a part of retina to inhibit myopic eye growth, the at least one defocusing zone having at least one less negative power;
wherein the at least one correcting zone and the at least one defocusing zone are alternated in the lens.

25. The method according to claim 1, wherein the multiple defocus images or the at least one non-homogenous defocused image projected by the at least one defocusing zone has a lower intensity than a retinal image projected by the at least one correcting zone.

26. A concentric multi-zone multifocal lens comprising:
at least one correcting zone of optical power for correcting refractive error; and
at least one defocusing zone having a progressive power profile for projecting multiple defocus images or at least one non-homogenous defocused image in front of at least a part of retina to inhibit myopic eye growth, the at least one defocusing zone having at least one less negative power, the at least one correcting zone and the at least one defocusing zone being alternated in the lens.

* * * * *